March 6, 1928.
T. H. PHILLIPS, JR
1,661,677
DISTANCE RESPONSIVE CONTROLLER
Filed Feb. 12, 1918
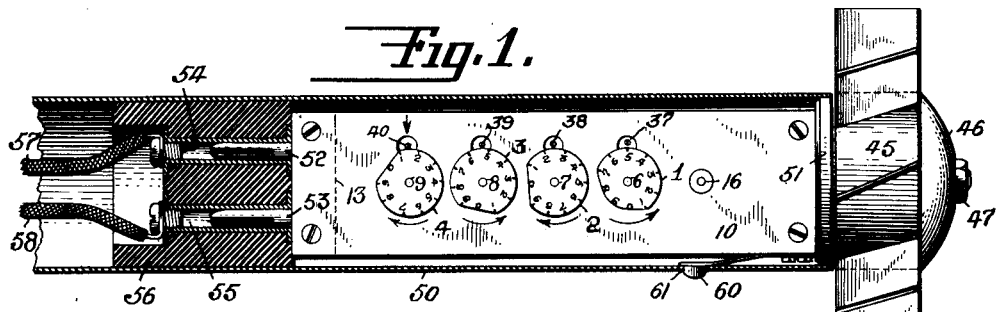
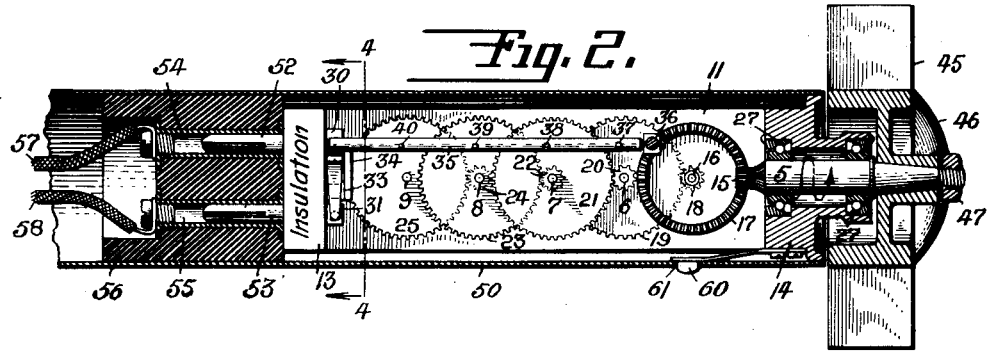
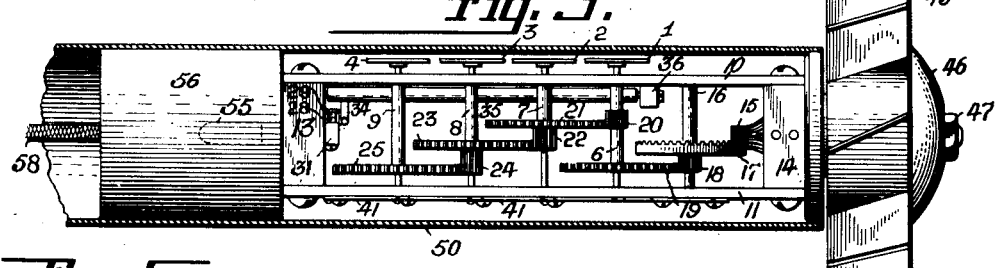
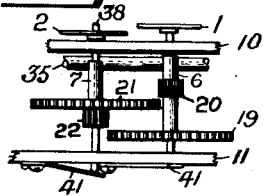
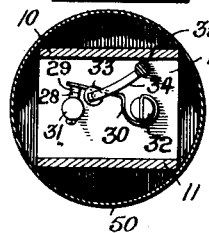
INVENTOR
THOMAS H. PHILLIPS, JR.
BY
Herbert H. Thompson
ATTORNEY Patented Mar. 6, 1928.

1,661,677

UNITED STATES PATENT OFFICE.

THOMAS H. PHILLIPS, JR., OF BROOKLYN, NEW YORK, ASSIGNOR TO THE SPERRY GYROSCOPE COMPANY, OF BROOKLYN, NEW YORK, A CORPORATION OF NEW YORK.

DISTANCE RESPONSIVE CONTROLLER.

Application filed February 12, 1918. Serial No. 216,809.

This invention relates to devices adapted to permit or cause actuation of a controller after a rotatable element has made a predetermined number of revolutions. More specifically, the invention relates to a device for effecting a change in an electrical circuit when a wind-wheel has made a predetermined number of revolutions.

Although my invention is capable of broad application, it is especially adapted for use in connection with aerial torpedoes. The latter are equipped with a device for opening or closing a switch, valve or other controller to bring the torpedo down or fire the same after a wind-wheel actuating or controlling said device has made a predetermined number of revolutions. i. e., after the torpedo has traveled a predetermined distance.

One of the principal objects of the present invention is to provide a device of the above mentioned class which may be set accurately to any predetermined unit of distance or fraction thereof.

Another object is to provide a device which is compact, light and which offers little air resistance. Further objects and advantages will appear as the invention is hereinafter developed.

Referring to the drawings which illustrate what I now consider the preferred form of my invention:

Fig. 1 is a fragmentary plan view partly in section of my device.

Fig. 2 is a similar view with the top cover plate removed.

Fig. 3 is an elevation, partly in section, of the structure shown in Fig. 1.

Fig. 4 is a section taken on the line 4—4 of Fig. 2.

Fig. 5 is a detail elevation of a part of the mechanism shown in Fig. 1.

Fig. 6 is a plan view on a different scale showing my device applied to one of the vertical struts of an aircraft.

My invention is shown as comprising a plurality of members 1, 2, 3, 4 rotatably mounted and adapted to be driven by a rotatable element 5 through any suitable gearing. The rotatable mounting of said members 1 to 4 may be effected by mounting them on the projecting ends of shafts 6 to 9 respectively, each rotatably mounted in plates 10 and 11 secured to end plates 13 and 14. The drive connection, above-mentioned, may be effected by the gearing illustrated which may be arranged substantially as follows:

The element or shaft 5, which is shown journaled in ball bearings 27 in plate 14 may be provided with a pinion 15 secured thereto and adapted to mesh with a crown wheel 17 secured to a shaft 16 journaled in plates 10 and 11. The shaft 16 may also have secured thereto a pinion 18 adapted to mesh with a gear 19 secured to shaft 6 and similar gearing 20 to 25 may be provided between the shafts 6—7, 7—8 and 8—9.

The members 1 to 4 are utilized to control the actuation of a controller and while this controller may assume the form of a normally open or closed switch, valve or other controlling means I have shown, for simplicity a normally open switch adapted to close when said members 1 to 4 are in a predetermined position. This switch or controller is shown as comprising a contact 29 carried by a spring arm 30 and thereby biased toward a contact 28, the latter and the arm 30 being carried by terminal posts 31 and 32, respectively, mounted in plate 13, which is preferably constructed of insulating material. The contact 29 is normally held away from contact 28 by a roller 33, of ivory or other suitable material, engaging arm 30 and carried by arm 34 secured to a rock-shaft 35.

The rock-shaft 35, which is shown journaled at one end in plate 13 and at its other end in a bracket 36 secured to plate 10, is shown as provided with a plurality of pins 37 to 40 projecting upwardly through openings in the plate 10 and each adapted to engage the peripheral edge of a corresponding one of members 1 to 4 which are made substantially circular. The members 1 to 4 are each shown as provided with a cut-away portion and the design of the parts is such that the contact 29 is held away from contact 28 against the action of the spring 30 unless the cutaway portion of each of members 1 to 4 is adjacent its corresponding pin 37, 38, 39 or 40. Furthermore, in order to reduce friction, I prefer to so arrange the parts that when pin 40 is in engagement with the uncut portion of its disc 4 the remaining pins 37 to 39 will not engage their discs and when 39 engages the uncut portion of its disc 3 the preceding pins 38 and 37 will not engage their discs, etc., (see Fig. 1).

For a purpose which will hereinafter appear, I prefer to make the members 1 to 4 adjustable with respect to each other and with respect to their pins 37 to 40. While this might be accomplished by so mounting the members 1 to 4 on their shafts 6 to 9 as to permit the former to be manually adjusted with respect to the latter I prefer to fixedly secure said members on said shafts and to utilize the structure illustrated and constructed substantially as follows:

Each of the shafts 6 to 9 may be depressed a sufficient amount in an axial direction against the action of a corresponding one of springs 41, secured at one end to the lower plate 11, to cause the gear on the depressed shaft to disengage the immediately preceding pinion (see Figs. 3 and 5). The depressed member may then be rotated without causing rotation of the preceding member and on release of the former the corresponding one of springs 41 will cause the gears to reengage.

For the purpose of aiding in adjusting the device for operation at any predetermined number of revolutions each of the members 1 to 4 may be divided into a number of equal scale divisions progressing in the intended direction of rotation of the corresponding member. It will be seen that each of the said members 1 to 4 is shown provided with ten equi-angularly spaced divisions numbered 0 to 9 adapted to be read in conjunction with a reference line on a corresponding one of pins 37 to 40. It will be noted that the cutaway portions are so arranged on members 1, 2, 3 and 4 that the pins 37, 38, 39 and 40 will assume the inner position when the zeros on said members register with the lines on said pins. Furthermore, the member 1 is cutaway slightly more than the other members, on the 9 side of 0 to permit the switch 28—29 to remain closed an appreciable length of time.

Assuming that the shaft 5 is adapted to be rotated in the direction of the arrow in Fig. 2, that the gear ratio between shafts 5—16, 16—6, 6—7, 7—8, and 8—9 is one to ten and that dials 1 to 4, are set on zero positions, the operation of my invention as thus far disclosed may be substantially as follows. If it is desired to cause the switch 28—29 to close after the shaft 5 has made, say, 86,930 revolutions, the dial 4 should be depressed and the numeral 8 caused to register with the line on pin 40 and said dial should then be released. The members 3, 2, and 1 should then be successively set on numerals 6, 9 and 3, respectively in a similar manner. When the shaft 5 has made 86,930 revolutions the cutaway portions on discs 1 to 4 come opposite pins 37 to 40 and permit the latter to move inwardly, i. e., in the direction of the arrow in Fig. 1, thus permitting closure of switch 28—29. Obviously the device may be set to cause closure of said switch after any desired number of revolutions of shaft 5 between the limits of 10 and 99,990 revolutions for the structure shown. Care should be taken to rotate each disc during the adjusting or setting operation in a direction opposite to its direction of rotation by the shaft 5. Care should also be taken to place the dials on zero position before any setting is made. It will be obvious also that the range of operation may be increased by increasing the number of members 1, 2, etc.

While my device as above disclosed is capable of broad application, it is especially adapted for use on an aerial torpedo as has been previously mentioned. Thus the projecting end of shaft 5 may have a windwheel 45 detachably secured thereto by means of nut 47 screwed on the end of said shaft. A curved shell 46 may be provided between the nut 47 and wheel 45 as shown in order to reduce the air resistance to a minimum. The wheel 45 may be made of such pitch as to rotate one revolution when moved forward one yard in which case setting of members 1, 2, 3 and 4 will indicate tens, hundreds, thousands and ten-thousands of yards in distance traversed and the device may be adjusted to cause closure of switch 28—29 when the aircraft on which the device is used has traveled any predetermined number of yards within the limits of the device.

The device may be detachably mounted within a tube 50, the front plate 14 being provided with an enlarged circular portion 51 to serve as a guide and closure for the tube. The posts 31, 32 may be prolonged to form plugs 52, 53 adapted to seat in metallic sockets 54, 55 mounted in a plug of insulation 56 mounted in tube 50. Conducting wires 57, 58 may be secured to the sockets 54, 55 for the purpose of connecting the switch 28—29 to any devices adapted to be controlled. In order to prevent accidental disconnection of the device and tube a manually releasable spring catch 60 may be secured to the plate 14 and adapted to enter an opening 61 provided in tube 50 when the device is placed in the said tube. The last mentioned element may be provided with rearwardly extending clamping arms 62 and 63 adapted to clamp one of the vertical struts 65 of an aircraft, said clamping arms being provided with a bolt 64.

It will be seen that each of the discs 1, 2 and 3 performs at least two functions; one function being to act as a micrometer setting dial for the succeeding disc or discs and another function being to act as a cam to give an accurate point of closure for the controller. Furthermore, by virtue of the clutch connection between each disc and the immediately preceding disc it is possible to set the device quickly and without unnecessary wear and tear on the gearing and other movable elements.

It will also be seen that by means of my device it can readily be determined when the aircraft on which the device is located has traveled through the air a given distance. For example, the disks 1—4 may be set so that their zeros will come opposite the reference marks on pins 37—40 after shaft 5 has made a given number of revolutions, which corresponds, of course, to a given air distance of travel of the craft. By "air-distance" of travel I mean the distance traveled by the aircraft with respect to the air. The actual air-distance of travel of the aircraft may readily be determined at any time by observing the readings of said disks.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. An air-distance measuring instrument for aircraft comprising an elongated casing, means for securing the same in an exposed position on the aircraft, a forwardly positioned revoluble nose on said casing, blades secured to said nose, a train of gearing in said casing operated by said nose, and distance indicating means actuated by said gearing.

2. An air-distance measuring instrument for aircraft comprising an elongated casing, means for securing the same in an exposed position on the aircraft, a shaft journalled in said casing with its axis substantially parallel to the longitudinal axis of said casing and projecting from the forward end thereof, a fan adjacent the forward end of said shaft, a train of gearing in said casing operated by said shaft, and distance indicating means actuated by said gearing.

3. A distance-limiting device for an aerial torpedo comprising an elongated casing, means for securing the same in an exposed position on the aircraft, a shaft journalled in said casing with its axis substantially parallel to the longitudinal axis of said casing and projecting from the forward end thereof, a fan adjacent the forward end of said shaft, a train of gearing in said casing operated by said shaft, and a controller actuated by a predetermined number of revolutions of said gearing.

4. An air-distance measuring instrument for aircraft comprising an elongated casing, means for securing the same in an exposed position on the aircraft, a shaft journalled in said casing with its axis substantially parallel to the longitudinal axis of said casing and projecting from the forward end thereof, a fan adjacent the forward end of said shaft, a train of gearing in said casing operated by said shaft, means for initially setting said gears for a predetermined distance, and controller brought into operation by the rotation of said gears through the distance set.

5. An air-distance responsive device for aircraft comprising a plurality of dials, a step-down gearing between each dial and the immediately preceding dial, a shaft, means operated by the forward movement of the craft for continuously rotating said shaft, a controller, means for setting each dial independently of said preceding dials and means brought into action when said dials have all assumed a predetermined position, for bringing into operation said controller.

6. A distance-responsive device for aircraft comprising in combination a plurality of discs, each provided with a portion of different diameter than the remaining part, speed reduction gearing between one of said discs and at least one other of said discs, a shaft operated by the movement of the aircraft, operative connections between said shaft and at least one of said discs, a controller and means for governing said controller comprising a movable part located in juxtaposition to each of said discs.

7. In a register or the like of aircraft, in combination, a frame, a shaft rotatably supported in said frame, a fan on said shaft, a switch carried by said frame and governed by said shaft, to be actuated on a predetermined number of revolutions of said shaft, a housing for said frame adapted to be secured to the aircraft, a contact carried by said frame and electrically connected to said switch and a contact carried by said housing and adapted to be engaged by said first mentioned contact when said frame is inserted into said housing.

In testimony whereof I have affixed my signature.

THOMAS H. PHILLIPS, Jr.